United States Patent
Meacci et al.

(10) Patent No.: US 8,630,605 B2
(45) Date of Patent: Jan. 14, 2014

(54) SYNCHRONIZATION SYSTEM AND METHOD FOR ACHIEVING LOW POWER BATTERY OPERATION OF A VEHICLE LOCATING UNIT IN A STOLEN VEHICLE RECOVERY SYSTEM WHICH RECEIVES PERIODIC TRANSMISSIONS

(75) Inventors: Fabio Meacci, Cambridge, MA (US); Michael Goodwin, North Andover, MA (US); James A. Justice, Medfield, MA (US); Jesse L. Rhodes, Franklin, MA (US)

(73) Assignee: LoJack Corporation, Canton, MA (US)

( * ) Notice: Subject to any disclaimer, the term of this patent is extended or adjusted under 35 U.S.C. 154(b) by 102 days.

(21) Appl. No.: 12/925,159

(22) Filed: Oct. 14, 2010

(65) Prior Publication Data
US 2011/0098015 A1 Apr. 28, 2011

Related U.S. Application Data

(60) Provisional application No. 61/279,630, filed on Oct. 23, 2009.

(51) Int. Cl.
*H04B 1/16* (2006.01)

(52) U.S. Cl.
USPC .............. 455/343.2; 455/343.1; 455/574; 455/231; 455/404.1; 455/404.2; 455/410; 370/311; 340/7.32; 340/7.33; 340/7.35

(58) Field of Classification Search
USPC ............ 455/343.5, 67.11, 343.2, 343.1, 574, 455/231, 404.1, 404.2, 410; 342/374; 370/311; 340/7.32, 7.35, 7.33
See application file for complete search history.

(56) References Cited

U.S. PATENT DOCUMENTS

| 4,177,466 | A | 12/1979 | Reagan |
| 4,818,988 | A | 4/1989 | Cooperman et al. |
| 4,908,609 | A | 3/1990 | Stroomer |
| 5,704,008 | A | 12/1997 | Duvall, Jr. |
| 5,917,423 | A | 6/1999 | Duvall |
| 6,229,988 | B1 | 5/2001 | Staplefeld et al. |
| 6,522,698 | B1 | 2/2003 | Irving et al. |
| 6,665,613 | B2 | 12/2003 | Duvall |
| 7,593,711 | B2 | 9/2009 | Romano et al. |
| 7,853,218 | B2 | 12/2010 | Romano et al. |
| 2004/0130488 | A1 | 7/2004 | De Champlain |
| 2006/0255935 | A1 | 11/2006 | Scalisi et al. |
| 2007/0008108 | A1 | 1/2007 | Schurig et al. |

OTHER PUBLICATIONS

U.S. Appl. No. 12/589,498, filed Apr. 28, 2011, Justice et al.
Written Opinion of the International Searching Authority for PCT Application No. PCT/US 10/02789 mailed Dec. 29, 2010 (nine (9) pages).

*Primary Examiner* — Junpeng Chen
(74) *Attorney, Agent, or Firm* — Goodwin Procter LLP

(57) ABSTRACT

Synchronization for achieving low power battery operation of a vehicle locating unit in a stolen vehicle recovery system whose radio receiver receives periodic transmissions, includes receiving periodic transmissions; turning on a radio receiver for a limited time to detect an expected message; if an expected message is not found, turning off the receiver and turning it on again after a time asynchronous with the transmission period; and after finding an expected message, waiting for the period of the transmissions less the length of an expected message and then looking for a synchronization symbol in the expected message and synchronizing subsequent actuation of the receiver using that synchronization symbol.

14 Claims, 9 Drawing Sheets

SYNCHRONIZATION SYSTEM AND METHOD FOR ACHIEVING LOW POWER BATTERY OPERATION OF A VEHICLE LOCATING UNIT IN A STOLEN VEHICLE RECOVERY SYSTEM WHICH RECEIVES PERIODIC TRANSMISSIONS

RELATED APPLICATIONS

This application claims benefit of and priority to U.S. Provisional Application Ser. No. 61/279,630 filed Oct. 23, 2009 under 35 U.S.C. §§119, 120, 363, 365, and 37 C.F.R. §1.55 and §1.78 incorporated herein by this reference.

FIELD OF THE INVENTION

This invention relates to a synchronization system for achieving low power battery operation of a vehicle locating unit in a stolen vehicle recovery system which receives periodic transmissions.

BACKGROUND OF THE INVENTION

The applicant's successful and popular vehicle recovery system sold under the trademark LoJack® includes a small electronic vehicle locating unit (VLU) with a transponder hidden within a vehicle, a private network of communication towers each with a remote transmitting unit (RTU), one or more law enforcement vehicles equipped with a vehicle tracking unit (VTU), and a network center with a database of customers who have purchased a VLU. The network center interfaces with the National Criminal Information Center. The entries of that database comprise the VIN number of the customer's vehicle and an identification code assigned to the customer's VLU.

When a LoJack® product customer reports that her vehicle has been stolen, the VIN number of the vehicle is reported to a law enforcement center for entry into a database of stolen vehicles. The network center includes software that interfaces with the database of the law enforcement center to compare the VIN number of the stolen vehicle with the database of the network center which includes VIN numbers corresponding to VLU identification codes. When there is a match between a VIN number of a stolen vehicle and a VLU identification code, as would be the case when the stolen vehicle is equipped with a VLU, and when the center has acknowledged the vehicle has been stolen, the network center communicates with the RTUs of the various communication towers (currently there are 180 nationwide) and each tower transmits a message to activate the transponder of the particular VLU bearing the identification code.

The transponder of the VLU in the stolen vehicle is thus activated and begins transmitting the unique VLU identification code. The VTU of any law enforcement vehicles proximate the stolen vehicle receive this VLU transponder code and, based on signal strength and directional information, the appropriate law enforcement vehicle can take active steps to recover the stolen vehicle. See, for example, U.S. Pat. Nos. 4,177,466; 4,818,988; 4,908,609; 5,704,008; 5,917,423; 6,229,988; 6,522,698; and 6,665,613 all incorporated herein by this reference.

Since the VLU operates on a battery, either its own or the vehicle's, there are constraints on the VLU's power consumption. In vehicle powered configurations it must operate in a manner that meets automotive industry current drain requirements for devices attached to the automotive electrical systems. In independent, self-contained battery powered configurations present goals require operation on a single battery for many years, e.g. 10 years. Thus, it is an ever present challenge to reduce the magnitude and time of power required.

SUMMARY OF THE INVENTION

In accordance with various aspects of the subject invention in at least one embodiment the invention presents an improved synchronization system in a vehicle locating unit in a stolen vehicle recovery system that keeps power requirements low enough to meet automotive industry requirements and/or operate on a single battery for many, many years and enables synchronization with transmitting towers that ensures VLU battery on-times of as little as 13 ms in 64 seconds.

The subject invention results from the realization, in part, that an improved synchronization system for achieving low power battery operation of a vehicle locating unit in a stolen vehicle recovery system which receives periodic transmissions from one or more transmission towers can be accomplished using a radio receiver for receiving periodic transmissions; and a microprocessor configured to turn on the receiver for a limited time to detect an expected message; if an expected message is not found, turning off the receiver and turning it on again after a time asynchronous with the transmission period; after finding an expected message, waiting for the period of the transmissions less the length of an expected message and then looking for a synchronization symbol in the expected message and synchronizing subsequent actuation of the receiver using that synchronization symbol.

The subject invention, however, in other embodiments, need not achieve all these objectives and the claims hereof should not be limited to structures or methods capable of achieving these objectives.

This invention features a synchronization system for achieving low power battery operation of a vehicle locating unit in a stolen vehicle recovery system which receives periodic transmissions, including a radio receiver for receiving periodic transmissions; and a microprocessor configured to turn on the receiver for a limited time to detect an expected message; if an expected message is not found, turning off the receiver and turning it on again after a time asynchronous with the transmission period; after finding an expected message, waiting for the period of the transmissions less the length of an expected message and then looking for a synchronization symbol in the expected message and synchronizing subsequent actuation of the receiver using that synchronization symbol.

In preferred embodiments there may be a number of different, geographically arrayed, phased sources of the periodic transmissions and the microprocessor further may be configured to detect a corresponding synchronization symbol in a phased transmission from each of the phased sources, and select one of those phased periodic transmissions from one of the phased sources to synchronize to. The microprocessor may be configured to select for synchronization the phased periodic transmission which has the highest signal strength. The microprocessor may be further configured to recognize when synchronism is lost; check for synchronism a predetermined number of times and if synchronism is not detected waiting again for the period of a transmission less the length of an expected message and then look for a synchronization symbol. The microprocessor may be further configured to recognize when synchronism is lost; check for synchronism a predetermined number of times and if synchronism is not detected waiting again for the period of a transmission less the length of an expected message and then look for a synchronization symbol. The microprocessor may be further configured to monitor periodic transmissions from each of the phased sources for an expected message in at least one of the periodic transmissions. The microprocessor may be further configured, if no expected message is found, to return to turning on the receiver and if an expected message is found to return to looking for a synchronization symbol in the expected message.

The invention also features a synchronization method for achieving low power battery operation of a vehicle locating unit in a stolen vehicle recovery system whose radio receiver receives periodic transmissions, including receiving periodic transmissions; turning on a radio receiver for a limited time to detect an expected message; if an expected message is not found, turning off the receiver and turning it on again after a time asynchronous with the transmission period; and after finding an expected message, waiting for the period of the transmissions less the length of an expected message and then looking for a synchronization symbol in the expected message and synchronizing subsequent actuation of the receiver using that synchronization symbol.

In preferred embodiments there may be a number of different, geographically arrayed, phased sources of the periodic transmissions and the looking for a synchronization symbol may include detecting a corresponding synchronization symbol in a phased transmission from each of the phased sources, and selecting one of those phased periodic transmissions from one of the phased sources to synchronize to. The phased periodic transmission which has the highest signal strength may be selected for synchronization. The method may further include recognizing when synchronism is lost; checking for synchronism a predetermined number of times and if synchronism is not detected waiting again for the period of a transmission less the length of an expected message and then looking for a synchronization symbol. The method may further include recognizing when synchronism is lost; checking for synchronism a predetermined number of times and if synchronism is not detected waiting again for the period of a transmission less the length of an expected message and then looking for a synchronization symbol. The method may further include monitoring periodic transmissions from each of the phased sources for an expected message in at least one of the periodic transmissions. The method may further include, if no expected message is found, returning to turning on the radio receiver and if an expected message is found returning to looking for a synchronization symbol in the expected message.

BRIEF DESCRIPTION OF THE SEVERAL
VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
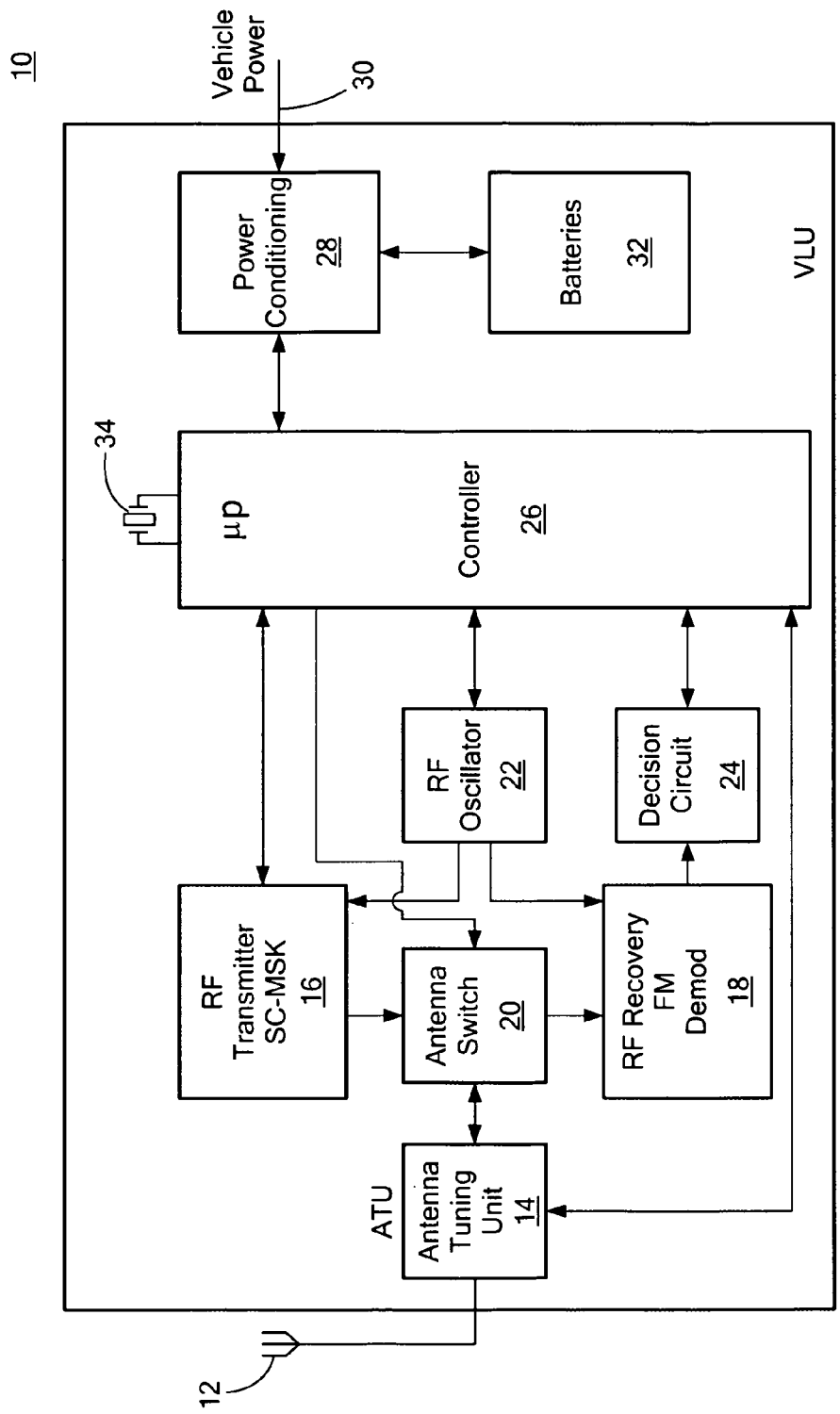
FIG. 1 is a schematic block diagram of a vehicle locator unit (VLU) including a synchronization system according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a vehicle locating unit (VLU) 10 used in a stolen vehicle recovery system which receives periodic transmissions from one or more geographically arrayed transmission sources or towers. VLU 10 includes an antenna 12 and antenna tuning unit 14. Antenna 12 through antenna tuning unit 14 may receive either a signal for transmission from RF transmitter 16 or may deliver incoming signals to RF receiver/FM demodulator 18. Antenna switch 20 determines which circuit the antenna feed will be connected to. A local RF oscillator 22 delivers the signal to transmitter 16 for modulation and to receiver 18 for demodulation of the signal. Demodulation may be generally referred to as minimum shift key or MSK and more typically is a SC-MSK or sub carrier modulated MSK. Antenna 12 receives and delivers to receiver 18 transmissions from one or more phased transmission sources or towers. For example, if the tower transmission period is 64 seconds and there are eight such phased sources or towers in a geographical array then each one will start its 64 second period eight seconds staggered from the last. Thus, if there were eight towers numbered one through eight the first one would start at 64 second period of transmission at time zero, the next tower would start at 64 second period of transmission at eight seconds, after eight more seconds at 16 seconds the third tower would start its transmission period and so on. The output from RF receiver/FM demodulator 18 is delivered to decision circuit 24 which transforms the sub carrier modulated MSK into a zero crossing signal to be delivered to microprocessor controller 26. Power is supplied to the VLU through power conditioning circuit 28 which can be connected to either or both vehicle power at 30 or internal batteries 32. Crystal oscillator 34 establishes a basic clock signal for microprocessor 26 and the VLU.

Figure 2:
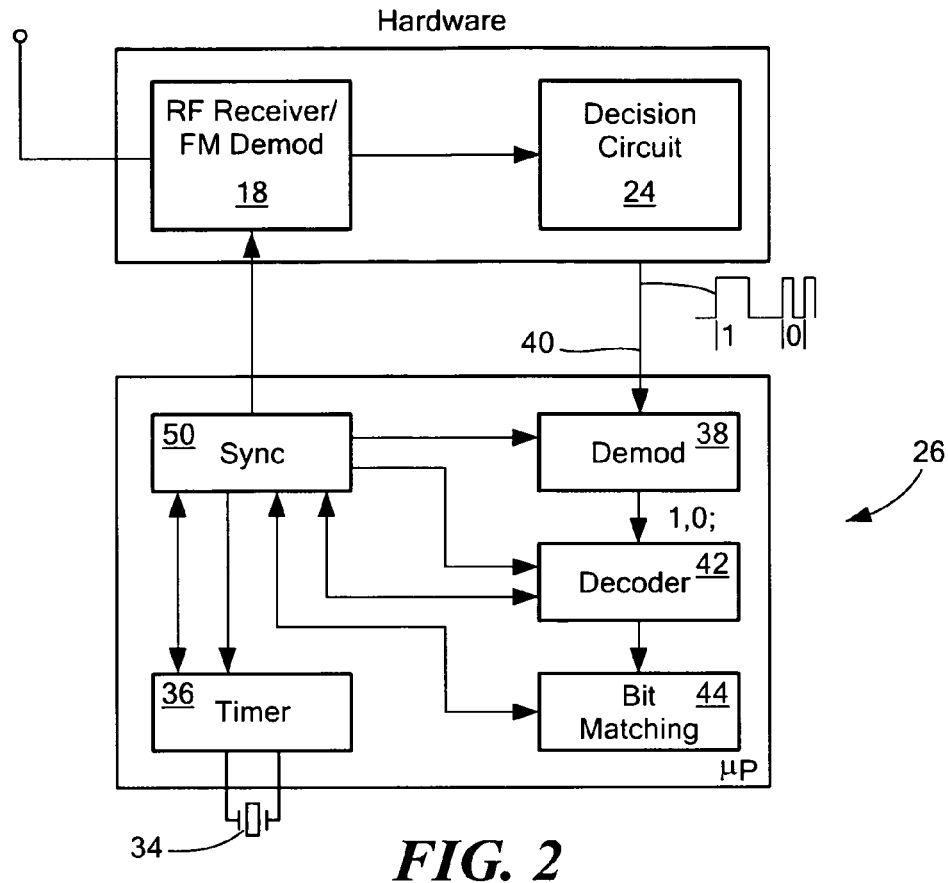
FIG. 2 is a more detailed illustration of the microprocessor and parts of the VLU of FIG. 1.

Controller or microprocessor 26 includes a timer 36, FIG. 2, responsive to crystal oscillator 34 and a demodulator 38 which receives the zero crossing signal on line 40 from decision circuit 24 and demodulates it to ones and zeros. The one and zero signals are submitted to decoder 42 which detects short and long flags and short and long preambles which are a part of the periodic transmission or burst sent by the one or more phased sources and received by the receiver 18 in VLU 10. Bit matching circuit 44 operates to review the incoming signal bit for bit and attempt to match it with known stored commands which the receiver expects. If at any point the bit match fails, the receiver is turned off as it has no further interest in the incoming signal. Also included in microprocessor 26 is the synchronization system 50 configuration of microprocessor 26.

Figure 3:
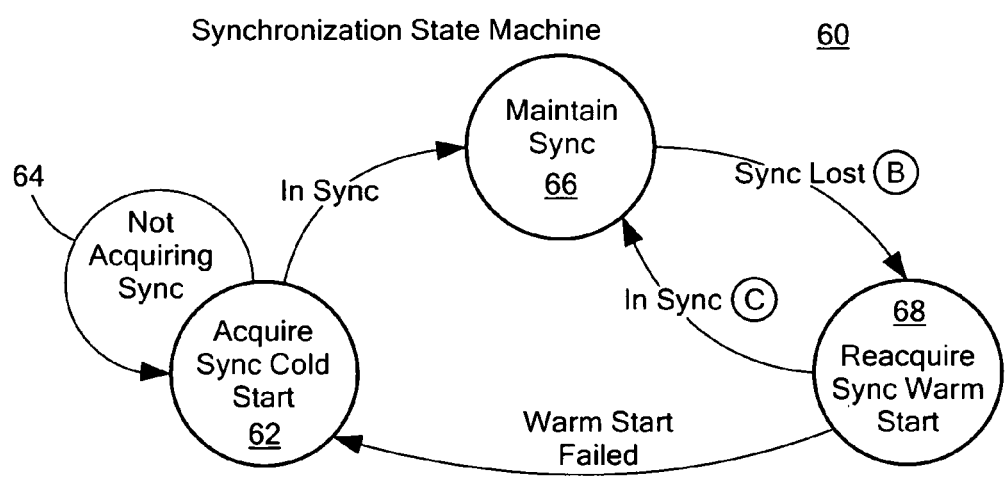
FIG. 3 is a state diagram showing the configuration of the microprocessor of FIGS. 1 and 2 effecting an embodiment of the synchronization system of this invention.

At the highest level the operation of synchronization system 50 is demonstrated by state diagram 60, FIG. 3. Basically it attempts to acquire synchronization from a cold start, 62, if it fails then it loops for some period of time, for example, 25 milliseconds trying to acquire synchronization and if it does not in that time as indicated by loop 64 then it shuts down and after a short delay it begins again. This delay should be a time that it is asynchronous with the transmission period e.g., a multiple or factor of an irrational number. If it has acquired synchronization then it moves to state 66 where it maintains the synchronization. If at any time it loses the synchronization, it moves to state 68 where it attempts, with a so called warm start, to reacquire synchronization. If it does reacquire synchronization it returns once again to state 66; if it doesn't, that is if the warm start fails, the system returns to state 62 and once again attempts to acquire synchronization through a cold start. The acquisition of synchronization through a cold start state 62, the maintenance of synchronization in state 66, and the reacquisition of synchronization with a warm start 68 are shown in FIGS. 5A, 5B, 6 and 7, respectively.

Figure 4:
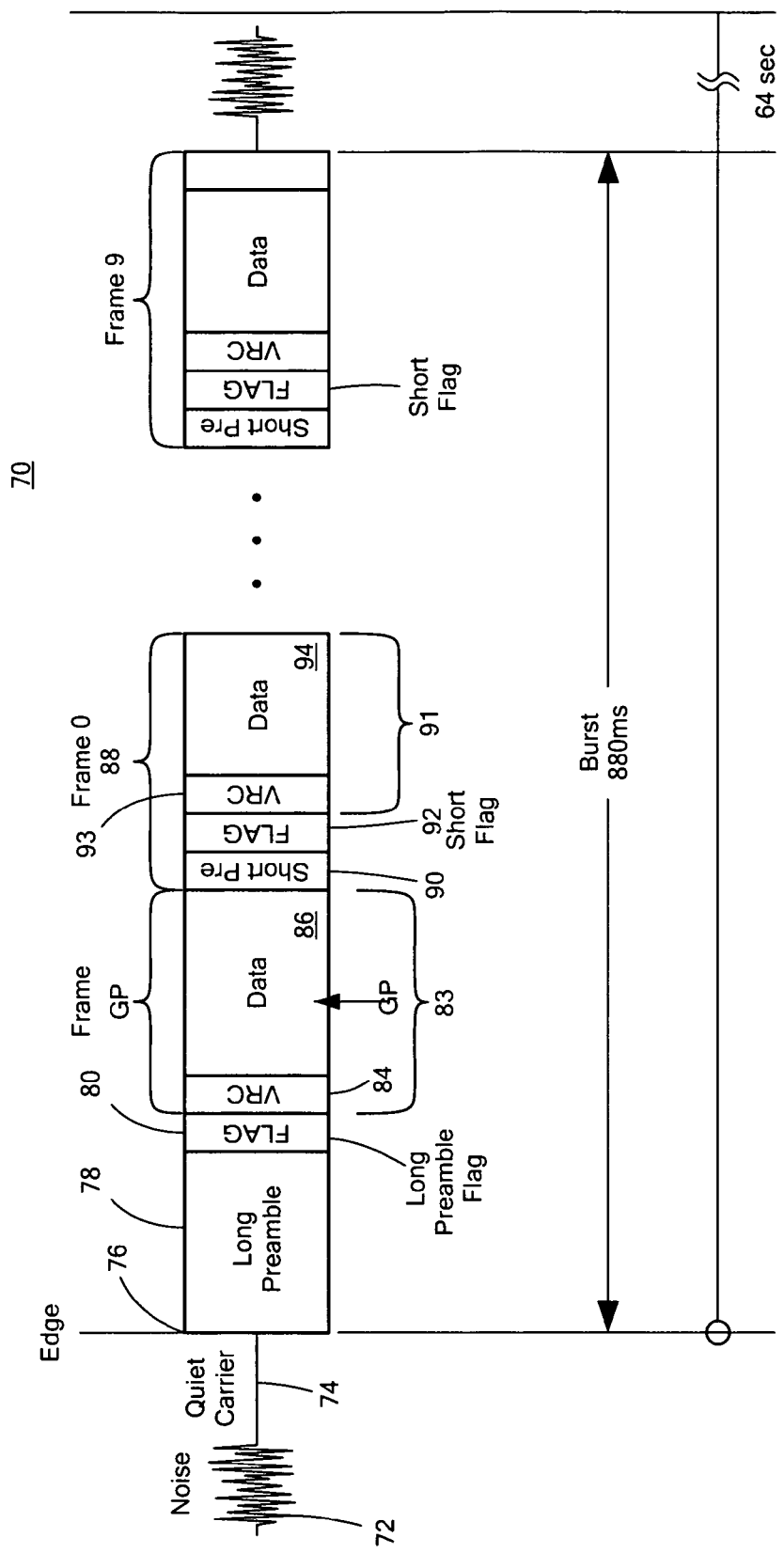
FIG. 4 is a diagrammatic view of the fields of a burst signal transmission received by the VLU of FIGS. 1 and 2.

The expected message 70, FIG. 4, also known as a burst which is transmitted by the transmission source or tower or by a number of phased transmission sources or towers appears diagrammatically in FIG. 4. To begin there is noise present 72 followed by a quiet carrier 74. Following this the expected message or burst 70 begins. Typically it has a duration of 880 ms and occurs every 64 seconds from a particular source. If there is more than one source, for example, as explained with respect to FIG. 1, if there are eight towers or transmission sources, each may start their bursts at 8 second intervals. The burst 70 leading edge 76 is followed by the long preamble 78 and a flag 80. Following this is the guaranteed packet message frame or index 82 which has a data section 83 including a vertical redundancy check 84 and the data 86. After that there are a number of message frames or indexes, for example, ten message frames designated message frame 0-message frame 9. Each message frame is constructed exactly the same and as shown with respect to message frame 0, 88 includes a short preamble 90, a flag 92, and a data section 91 having a vertical redundancy check section 93 and data 94.

Figure 5A:
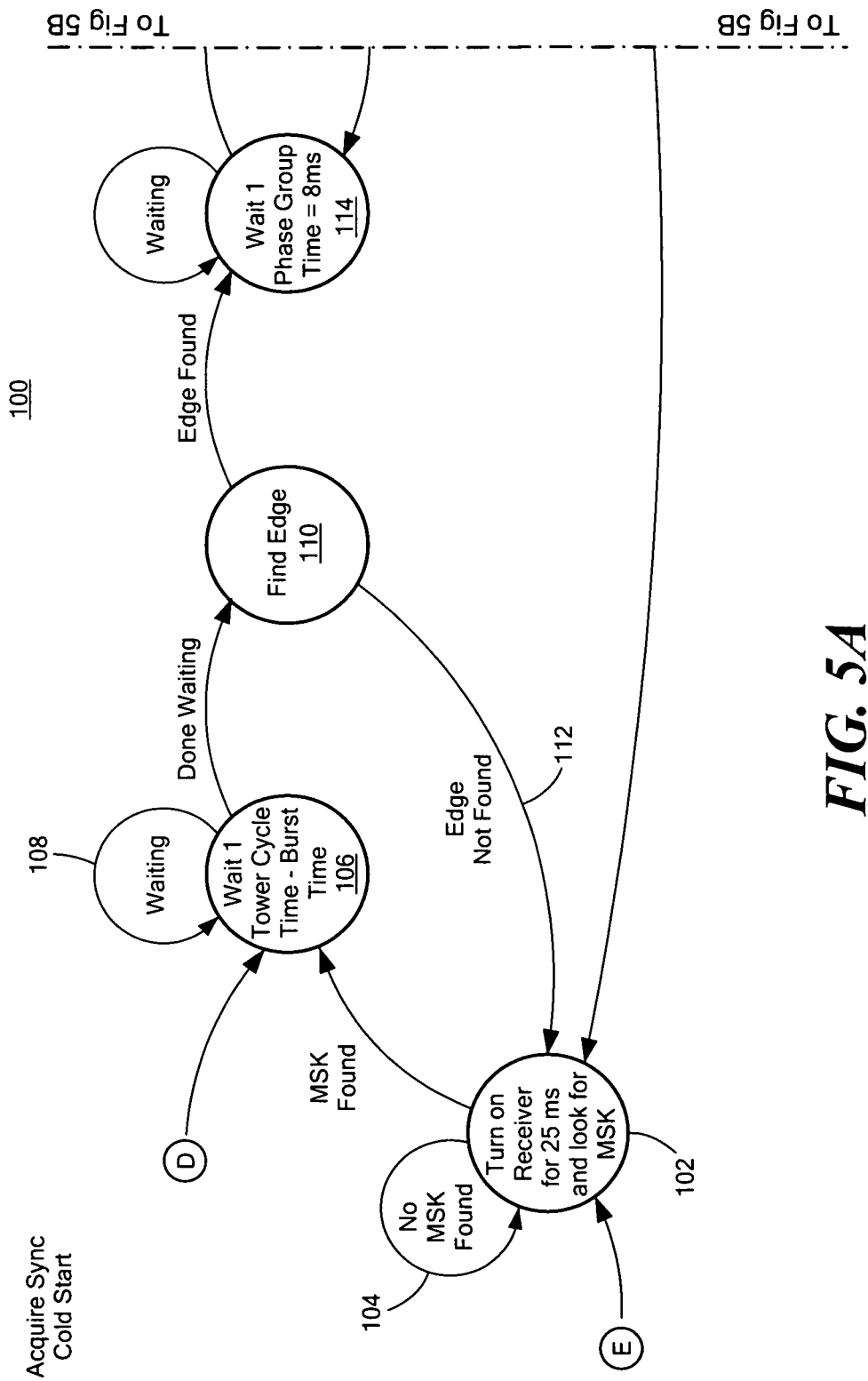
FIGS. 5A and 5B are a state diagram showing in more detail a portion of the configuration of the microprocessor of FIGS. 1 and 2 effecting an embodiment of the synchronization system of this invention for attaining synchronization operating from a "cold start"
Figure 5B:
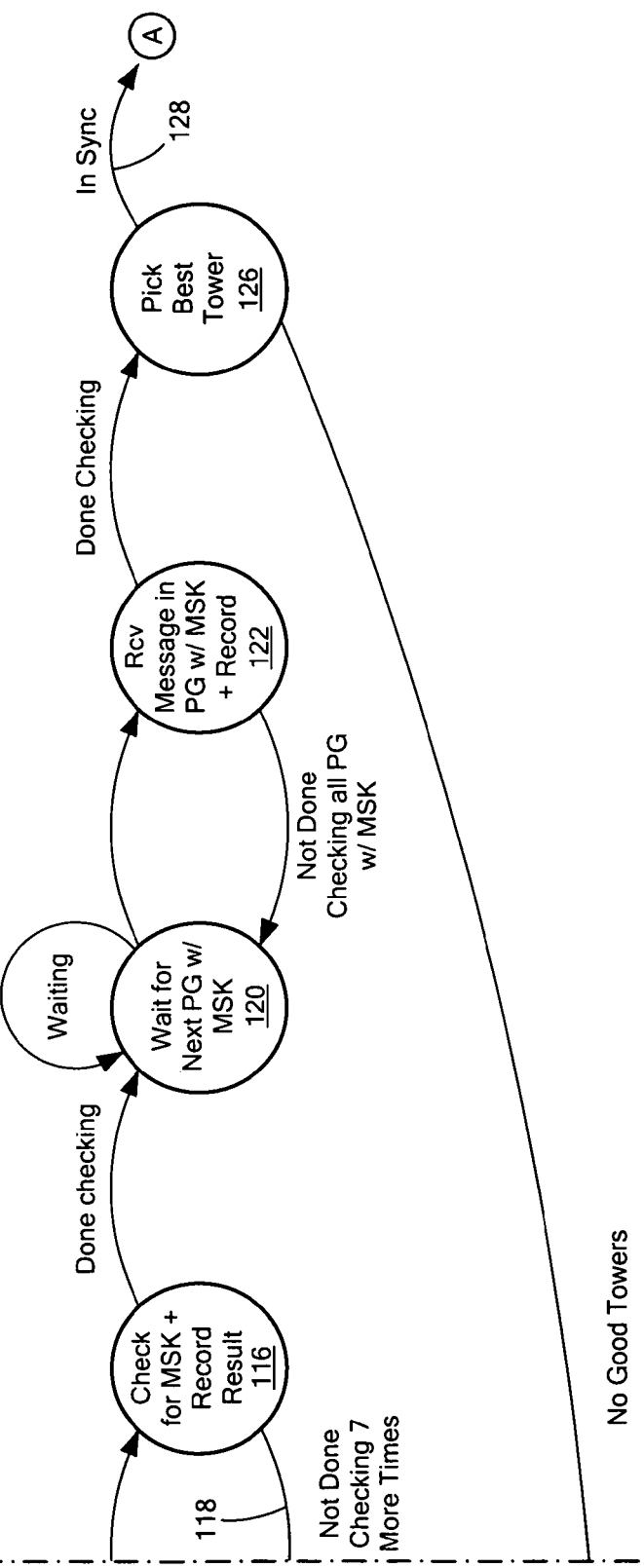

In one embodiment microprocessor 26 may operate a cold start operation in accordance with the state diagram 100, FIGS. 5A and B. Referring to FIGS. 4 and 5 the receiver is turned on in state 102 for X ms to look for a SC-MSK signal. At that point the receiver is turned off.

If it doesn't find an SC-MSK signal it waits Y seconds and tries again and keeps looping 104 until it does find an SC-MSK signal. When the receiver is turned on and off in state 102, FIG. 5A, the delay period from the time it is turned off until it turned back on again (a period of Y seconds) should be a period of time which is asynchronous with the transmission period so that it cannot either immediately or after some period of time be turning itself on repeatedly in a periodic non-productive time slot.

If an SC-MSK signal is found, then the system waits as in state 106 as indicated by loop 108 for the period of one tower cycle, e.g. 64 seconds less or minus a burst time. For example, as indicated with respect to FIG. 4, there may be a burst time of 880 ms so the wait time will be 64 seconds minus 880 ms. When the wait is over the system seeks to find an edge in 110. That is, it wishes to encounter preamble 78 and preamble flag 80 of FIG. 4. If it is not found the system loops back as shown at 112 to state 102, if it is found the system moves on. Since there may be more than one transmission source in the area, e.g. a number of transmission towers, the system enters state 114 where it waits one phase group time and checks for an SC-MSK signal again, repeating this action until all 8 phase groups are checked. For example, with a 64 second cycle and eight transmission sources in state 114 the system will move to state 116 and check for the appearance of a MSK every eight seconds and it will record the result. If after checking for MSK signal, it has not checked eight times, it returns along loop 118 to state 114. If it is done checking, that it is, it has done eight checks it moves to state 120 where it waits for the next one of the phase group which has been found to have an MSK. For example, if there were eight transmission source slots and three were found those three starting in state 120 would be sought and received again and recorded. The system loops back as indicated at state 122 until all the found MSKs have been reviewed again. When the receiver messages are received in state 122 they are recorded especially as to their strength and tower type, and finally in state 126 the best tower or best transmission is selected typically by the strength of its signal. Mode 1 is the lowest power operating mode and is suitable for networks with very low timing jitter.

For Mode 1 operation the VLU must now receive the first FLAG of the desired tower's burst, calculate the necessary timing offset to get to its assigned frame, wait the period of time designated by the timing offset, turn on the receiver to demodulate the short preamble and flag of its assigned message frame, and then receive as much as possible of the message frame before bit-matching aborts the operation, and then shut off the receiver. The VLU will then wait a period equal to the period of one tower cycle and repeat the same operation. In this mode of operation the VLU will never again (while synchronized) receive the first FLAG of the desired tower's burst, it will always turn on just prior to the short preamble and flag of its assigned message frame and attempt to receive the message frame.

For Mode 2 operation all the VLU will always receive the first FLAG of the desired tower's burst, calculate the necessary timing offset to get to its assigned frame, wait the period of time designated by the timing offset, turn on the receiver to demodulate the short preamble and flag of its assigned message frame, and then receive as much as possible of the message frame before bit-matching aborts the operation, and then shut off the receiver. The VLU will then wait a period equal to the period of one tower cycle and repeat the same operation. Mode 2 operation can be used when operating with tower network equipment that has much larger jitter.

At that point a synchronization signal is provided 128 (or the system is returned to state 102 because no good towers were found.) They system is now synchronized to the transmission signal and also with respect to the specific message frame 0-9, FIG. 4, that is associated with this particular VLU. The synchronization system 50, FIG. 2, will subsequently turn on the receiver at precisely the time appropriate to capture the index or frame 0-9 that is assigned to this particular VLU. For example, if this VLU is assigned to frame 0, 88, FIG. 4, then this system is synchronized to capture the short preamble 90 and then the short flag 92 and the data 91.

Figure 6:
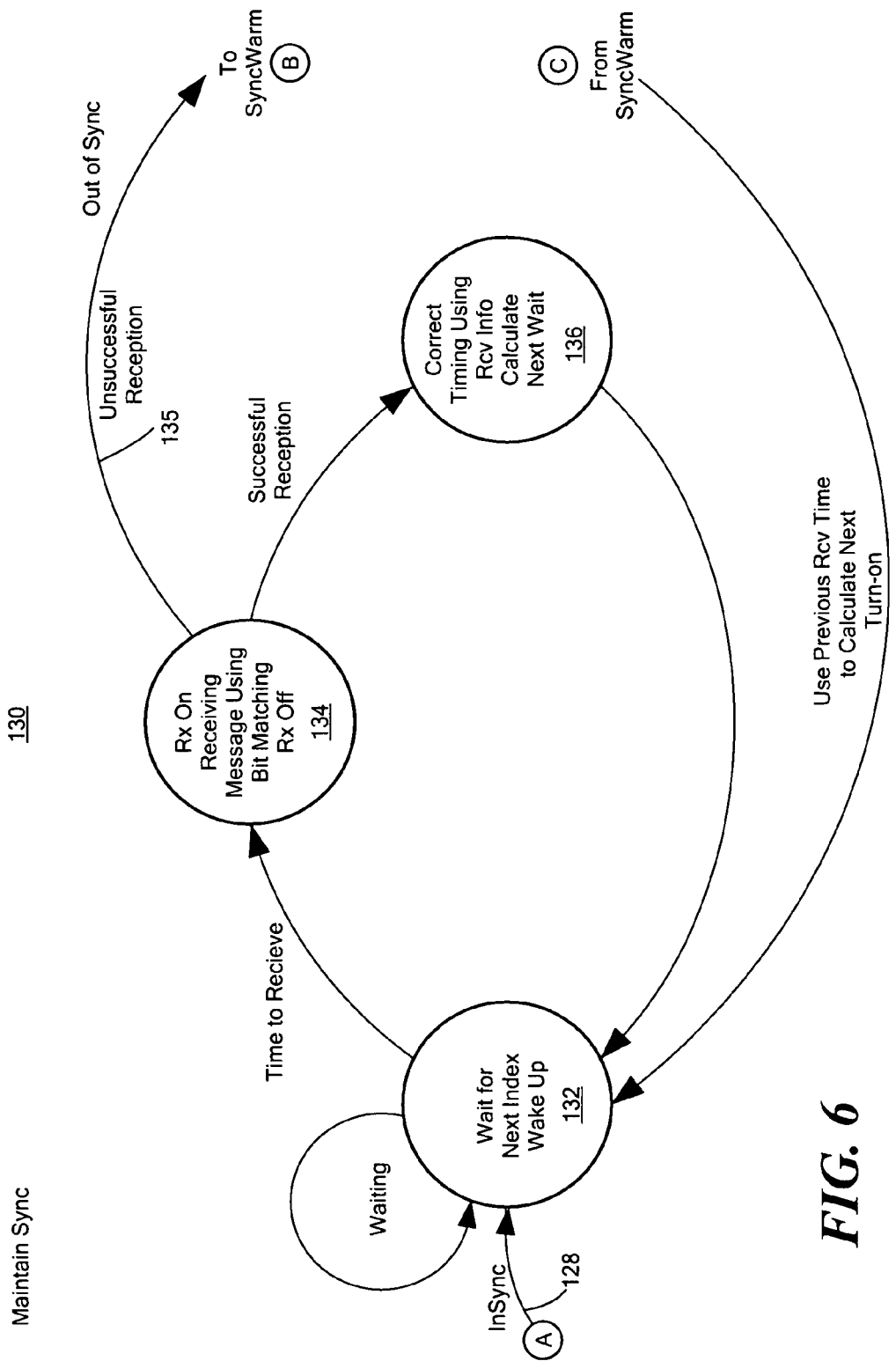
FIG. 6 is a state diagram showing in more detail a portion of a the configuration of the microprocessor of FIGS. 1 and 2 effecting an embodiment of the synchronization system of this invention operating to maintain synchronization.

The synchronization maintenance state diagram 130 is shown in FIG. 6. With the system synchronized 128, FIG. 6, it simply waits for the next index or frame wake-up in state 132. When it is time to receive the particular assigned frame or index it moves to state 134. The receiver is turned on and the message is received.

Message reception is a two step process. The first step is the reception of the Short Preamble and FLAG fields, and the second step is the reception of the DATA field.

If reception of the Short Preamble and FLAG fields are unsuccessful, Warm Start processing is initiated, the reception of the DATA field is terminated and the receiver is turned off.

If reception of the Short Preamble and FLAG is successful, reception of the DATA commences. To minimize power consumption, bit matching is used to match each bit in the data to be sure that it is a command that is intended for this VLU. If any bit doesn't match it the reception of the remaining part of the DATA field is terminated, the receiver is turned off, timing correction is applied, and synchronized reception is scheduled for the next tower transmission.

If the DATA field is a match for one of the messages intended for this VLU, the system decodes the message, performs the requested function, moves on to state 136 where it corrects for time using the receiver information to calculate the next wait and then returns to state 132 to wait for the next index wake-up.

Figure 7:
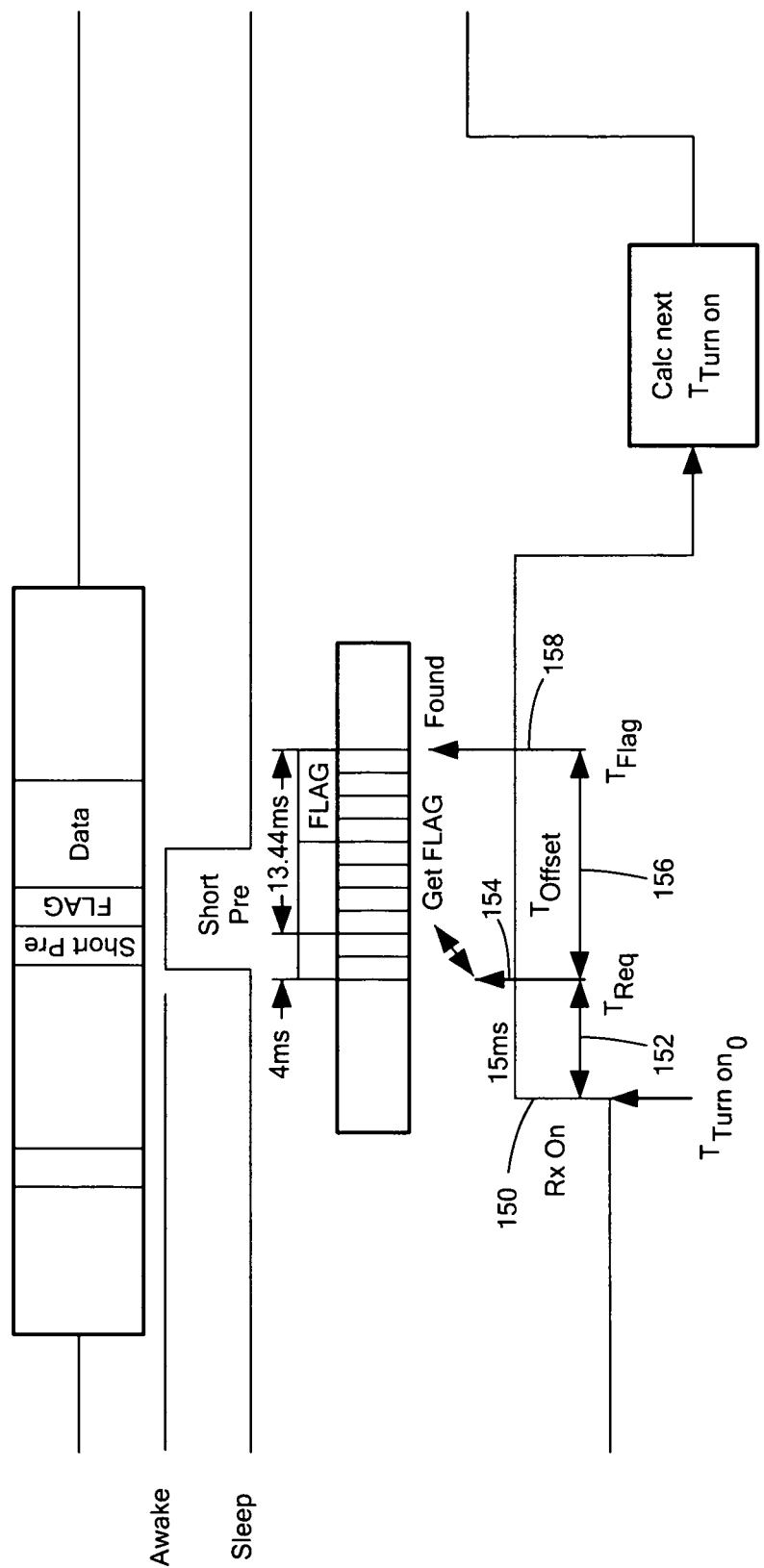
FIG. 7 is a diagrammatic view of a frame of a burst signal as shown in FIG. 4 illustrating correction of timing as set forth in the state diagram of FIG. 6.

The correction of timing in state 136 is depicted with reference to FIG. 7. When the receiver is turned on as at 150 a 15 ms delay is introduced 152 to give the system a chance to settle. Then a request is made to get the flag, meaning to find the short flag 92 which appears at the beginning of each frame. Once the flag is gotten at 154 the time offset is recorded 156 until the flag is found at 158. That time offset 156 is a fixed time, for example, 13.44 ms. If the flag is not found at exactly the right time that indicates that the system has drifted and that to maintain the timing of the VLU coincident with that of the transmission source or tower there will have to be an adjustment made.

Figure 8:
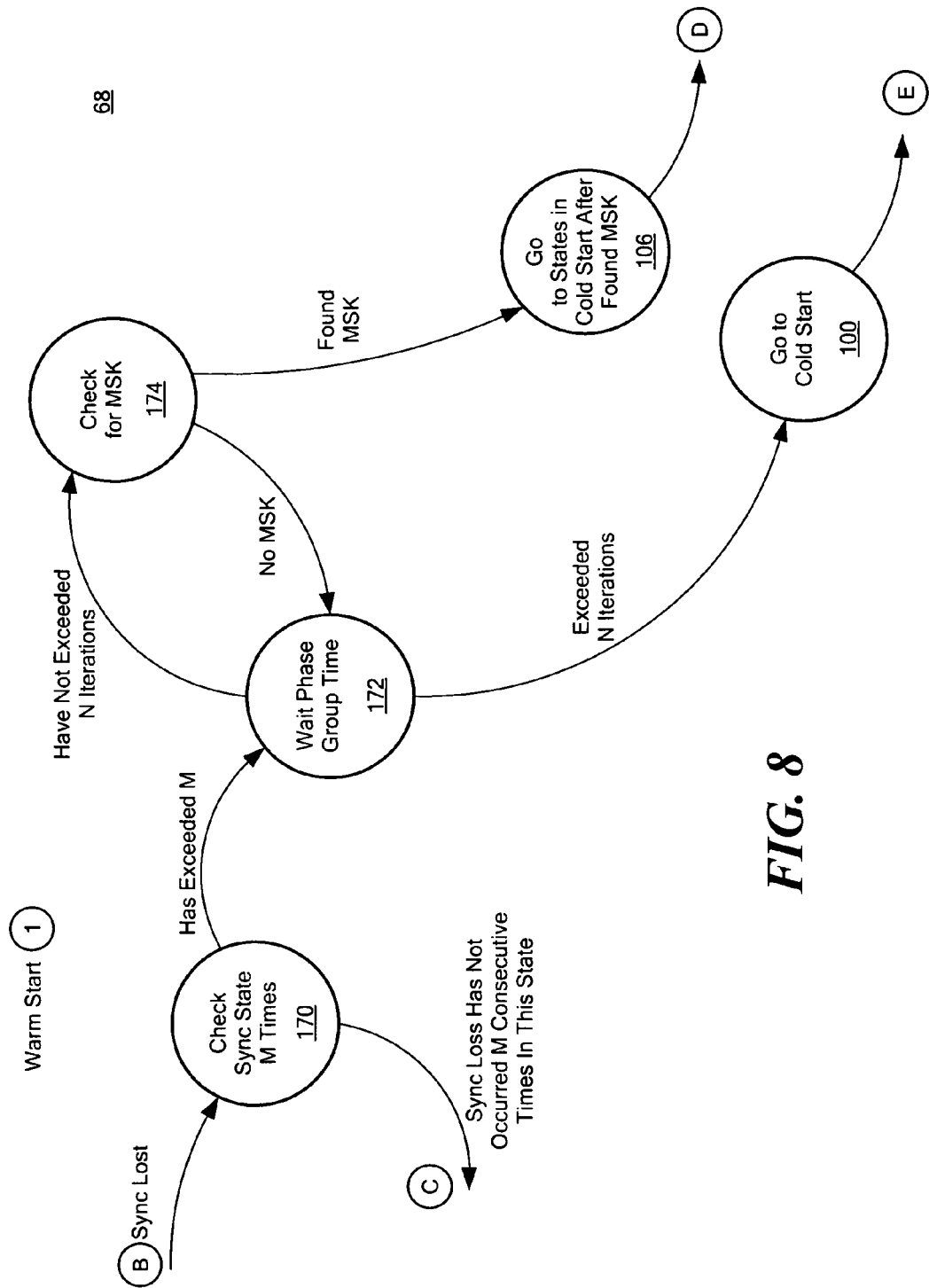
FIG. 8 is a state diagram showing in more detail a portion of a the configuration of the microprocessor of FIGS. 1 and 2 effecting an embodiment of the synchronization system of this invention operating from a "warm start"

The warm start 68 previously referred to is shown in more detail in FIG. 8. Note the capital letters A, B, C, D, and E on FIGS. 3, 5A, 5B, 6 and 7 are intended to show the interaction of the state diagrams 60, 68, 100 and 130 in those figures. The synchronization state is checked, a number of times in state 170, e.g. m times. If the synchronization loss has not occurred m consecutive times then the system determines that there has truly not been synchronized loss and returns through connection C FIG. 6, to wait for the next index wake-up in state 132. If on the other hand the checking of the synchronization condition in state 170 has exceeded m times then the system moves to state 172 where it waits a phase group time, e.g. eight seconds. If it hasn't exceeded n iterations then the system moves to state 174 where it checks for MSK again. If there is no MSK the system returns to wait for the phase group time. If in state 172 the system has exceeded n iterations then it goes to directly to cold start; if it has found MSK in 174 then it goes to the state 106 in the cold start state diagram 100, FIG. 5A.

Figure 9:
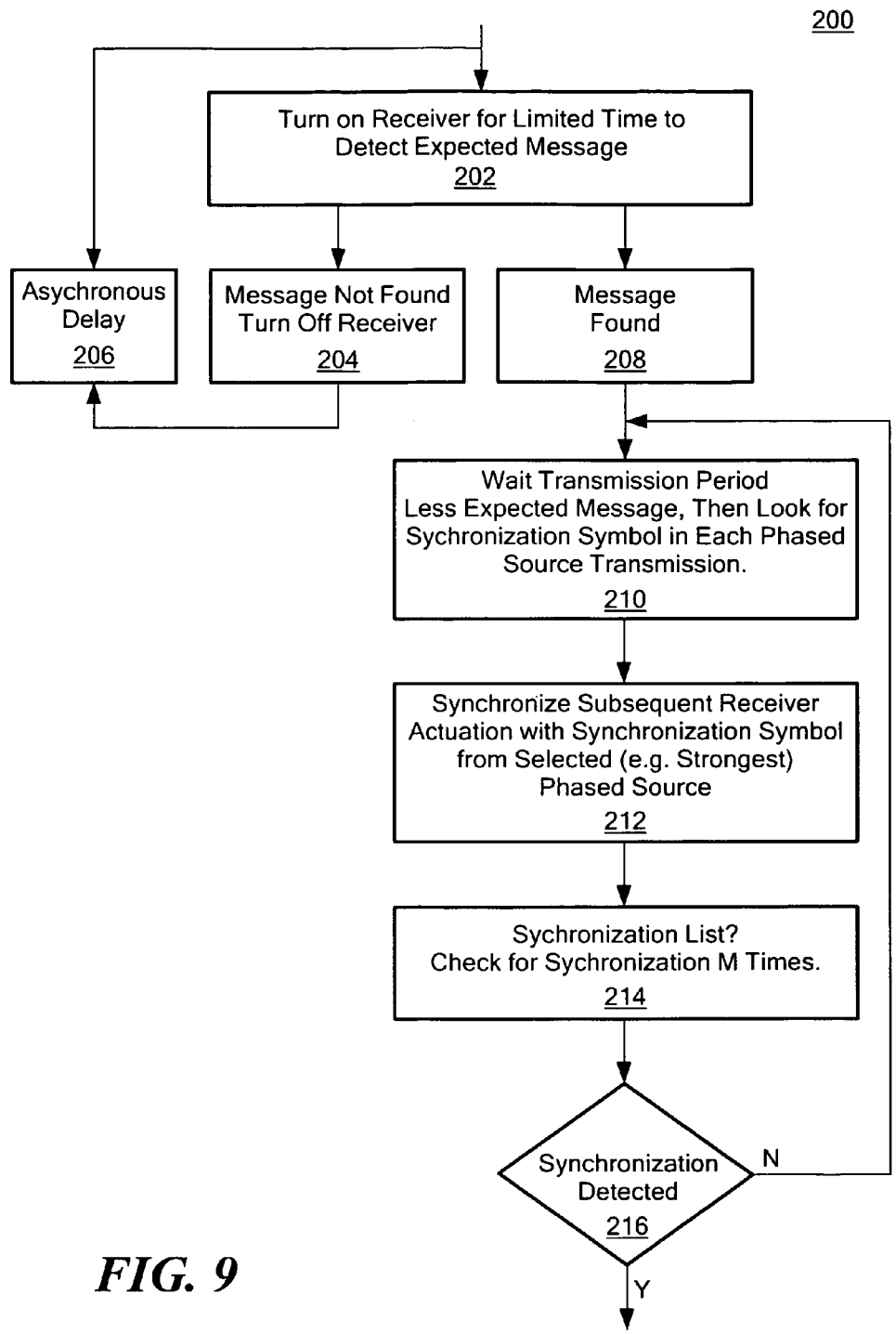
FIG. 9 is a flow chart of a method of synchronization in one embodiment of this invention.

Although thus far the embodiment of the invention is in terms of a synchronization system the invention also contemplates a method of synchronization for achieving the low power battery operation of a vehicle locating unit in a stolen vehicle recovery system which receives periodic transmissions as shown in FIG. 9. The synchronization, method 200, FIG. 9, begins with turning on the receiver for limited time to detect an expected message from one or more phased transmission sources, 202. If no message is found the receiver is turned off 204, and after a delay 206 for a period of time which is asynchronous with the transmission period, for example a factor or multiple of an irrational number like π, the system returns to step 202 to turn on the receiver once again. If a message is found 208 then the system waits for the transmission period less the expected message time 210 and then looks for a synchronization signal in each phased source transmission. Synchronization is then accomplished for subsequent receiver actuation 212 using the synchronization symbol from a selected (typically the highest signal strength) phased source. If the synchronization is lost a check for synchronization is made a number m of times 214; if the synchronism is detected 216 the system returns to normal operation, if not it returns to await transmission in step 210.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A synchronization system for achieving low power battery operation of a vehicle locating unit in a stolen vehicle recovery system which receives transmissions from at least one transmission source, each of said transmissions having a transmission cycle period and providing an expected message to the synchronization system, the expected message having a transmission duration, comprising:
 a radio receiver for receiving said transmissions; and
 a microprocessor configured to turn on said radio receiver for a limited time to detect the expected message; if the expected message is not found, turning off said radio receiver and turning it on again after a time asynchronous with the transmission cycle period; after finding the expected message, waiting for a length of time equal to the difference between the cycle period of the transmissions less the transmission duration length of the expected message and then looking for a synchronization symbol in the expected message and synchronizing subsequent actuation of said radio receiver using said synchronization symbol.

2. The synchronization system of claim 1 in which there are a number of different, geographically arrayed, phased sources of said transmissions and said microprocessor further is configured to detect a corresponding synchronization symbol in a phased transmission from each of said phased sources, and select one of those phased transmissions from one of said phased sources to synchronize to.

3. The synchronization system of claim 2 in which said microprocessor is configured to select for synchronization the phased transmission which has the highest signal strength.

4. The synchronization system of claim 1 in which said microprocessor is further configured to recognize when synchronism is lost; check for synchronism a predetermined number of times and if synchronism is not detected waiting again for the length of time equal to the difference between the cycle period of the transmissions less the transmission duration of the expected message and then look for a synchronization symbol.

5. The synchronization system of claim 2 in which said microprocessor is further configured to recognize when synchronism is lost; check for synchronism a predetermined number of times and if synchronism is not detected waiting again for the length of time equal to the difference between the cycle period of the transmissions less the transmission duration of the expected message and then look for a synchronization symbol.

6. The synchronization system of claim 5 in which said microprocessor is further configured to monitor phased transmissions from each of said phased sources for the expected message in at least one of the transmissions.

7. The synchronization system of claim 6 in which said microprocessor is further configured, if no expected message is found, to return to turning on said radio receiver and if the expected message is found to return to looking for a synchronization symbol in the expected message.

8. A synchronization method for achieving low power battery operation of a vehicle locating unit in a stolen vehicle recovery system whose radio receiver receives from at least one transmission source, each of said transmissions having a transmission cycle period and providing an expected message to the synchronization system, the expected message having a transmission duration, comprising:
   receiving said transmissions;
   turning on a radio receiver for a limited time to detect the expected message; if the expected message is not found, turning off said radio receiver and turning it on again after a time asynchronous with said transmission cycle period; and
   after finding the expected message, waiting for a length of time equal to the difference between the cycle period of the transmissions less the transmission duration of the expected message and then looking for a synchronization symbol in the expected message and synchronizing subsequent actuation of said radio receiver using said synchronization symbol.

9. The synchronization method of claim 8 in which there are a number of different, geographically arrayed, phased sources of said transmissions and said looking for a synchronization symbol includes detecting a corresponding synchronization symbol in a phased transmission from each of said phased sources, and selecting one of those phased from one of said phased sources to synchronize to.

10. The synchronization method of claim 9 in which the phased transmission which has the highest signal strength is selected for synchronization.

11. The synchronization method of claim 8 further including
   recognizing when synchronism is lost;
   checking for synchronism a predetermined number of times; and
   if synchronism is not detected, waiting again for the length of time equal to the difference between the cycle period of a transmission less the transmission duration of the expected message and then looking for a synchronization symbol.

12. The synchronization method of claim 9 further including
   recognizing when synchronism is lost;
   checking for synchronism a predetermined number of times; and
   if synchronism is not detected waiting again for the length of time equal to the difference between the cycle period of a transmission less the transmission duration of the expected message and then looking for a synchronization symbol.

13. The synchronization method of claim 12 further including monitoring phased transmissions from each of said phased sources for the expected message in at least one of the transmissions.

14. The synchronization method of claim 13 further including, if no expected message is found, returning to turning on said radio receiver and if the expected message is found returning to looking for a synchronization symbol in the expected message.

* * * * *

UNITED STATES PATENT AND TRADEMARK OFFICE
CERTIFICATE OF CORRECTION

PATENT NO. : 8,630,605 B2
APPLICATION NO. : 12/925159
DATED : January 14, 2014
INVENTOR(S) : Fabio Meacci et al.

Page 1 of 1

It is certified that error appears in the above-identified patent and that said Letters Patent is hereby corrected as shown below:

In the Claims

Claim 1, column 8, line 56, delete "length"

Claim 8, column 9, line 31, reads "recovery system whose radio receiver receives from at least" but should read --recovery system whose radio receiver receives transmissions from at least--

Claim 9, column 10, line 10, reads "phased sources, and selecting one of those phased from one of" but should read --phased sources, and selecting one of those phased transmissions from one of--

Signed and Sealed this
Eighteenth Day of March, 2014

Michelle K. Lee
*Deputy Director of the United States Patent and Trademark Office*